United States Patent Office 3,046,150
Patented July 24, 1962

3,046,150
PIGMENTS
Helen Dolores Jamieson, Woodlands, Malpas, Newport, Wales, assignor to Associated Lead Manufacturers Limited, London, England, a British company
No Drawing. Filed Apr. 13, 1961, Ser. No. 102,651
Claims priority, application Great Britain Apr. 25, 1960
6 Claims. (Cl. 106—296)

This invention provides a stain for incorporation in a glaze for ceramics and which will yield a glaze of attractive salmon pink colour.

The stain according to the invention consists of a calcined mixture of the following ingredients, parts being parts by weight:

|  | Parts |
|---|---|
| Zirconia or zircon | 25–90 |
| Ammonium metavanadate | 0–0.1 |
| Zinc oxide | 1–12 |
| Iron oxide | 1–12 |
| Chromium sesquioxide | 1–12 |
| Aluminium hydroxide | 0–6 |

The calcination temperature may be varied between 1200° C. and 1400° C., the temperature being reached in 3 to 4 hours and maintained for 1 hour.

The chromium may be added as alkali metal dichromate, trioxide or sesquioxide and the stain may be based upon either zircon or zirconia, the latter giving the more intense colour. A 50% mixture is the most economic proposition and gives a glaze having an entirely acceptable colour.

Typical formulations are as follows, the ingredients being given in parts by weight:

|  | 1 | 2 | 3 |
|---|---|---|---|
| Zirconia (F.B.M.) | 43.4 | 86.8 |  |
| Zircon | 43.4 |  | 86.7 |
| Ammonium Metavanadate | 0.04 | 0.04 | 0.04 |
| Zinc Oxide | 4.10 | 4.0 | 4.0 |
| Iron Oxide | 4.0 | 4.0 | 4.0 |
| Chromium Sesquioxide | 3.04 |  | 4.0 |
| Aluminium Hydroxide | 2.17 | 2.17 | 2.17 |
| Potassium Dichromate |  | 5.88 |  |

In each case the mixture of powdered ingredients was calcined at 1350° C. and the product added to a suitable zinc-containing glaze. 1.5% to 2% is a normal mill addition.

The glaze may conveniently be of the following composition:

|  | Moles |
|---|---|
| Sodium and potassium oxides (together) | 0.3 |
| Calcium oxide | 0.4 |
| Zinc oxide | 0.3 |
| Boric oxide | 0.6 |
| Alumina | 0.35 |
| Silica | 3.5 |

What I claim as my invention and desire to secure by Letters Patent is:

1. A stain for incorporation in a glaze for ceramics which is constituted by a calcined mixture of the following ingredients: at least one compound selected from the group consisting of zirconia and zircon 25–90 parts by weight, ammonium metavanadate 0–0.1 part by weight, zinc oxide 1–12 parts by weight, iron oxide 1–12 parts by weight, chromium sesquioxide 1–12 parts by weight and aluminium hydroxide 0–6 parts by weight.

2. A stain as claimed in claim 1, which contains equal amounts of zircon and zirconia.

3. A glaze for ceramics which contains a stain as claimed in claim 1.

4. A strain for incorporation in a glaze for ceramics which consists of a calcined mixture of zirconia 43.4 parts by weight, zircon 43.4 parts by weight, ammonium metavanadate 0.04 part by weight, zinc oxide 4.10 parts by weight, iron oxide 4.0 parts by weight, chromium sesquioxide 3.04 parts by weight and aluminum hydroxide 2.17 parts by weight.

5. A stain for incorporation in a glaze for ceramics which consists of a calcined mixture of zirconia 86.8 parts by weight, ammonium metavanadate 0.04 part by weight, zinc oxide 4 parts by weight, iron oxide 4.0 parts by weight, aluminum hydroxide 2.17 parts by weight and potassium dichromate 5.88 parts by weight.

6. A strain for incorporation in a glaze for ceramics which consists of a calcined mixture of zircon 86.7 parts by weight, ammonium metavanadte 0.04 part by weight, zinc oxide 4 parts by weight, iron oxide 4 parts by weight, chromium sesquioxide 4 parts by weight and aluminum hydroxide 2.17 parts by weight.

References Cited in the file of this patent
UNITED STATES PATENTS

| 2,347,630 | Harbert | Apr. 25, 1944 |
| 2,847,317 | Carnahan et al. | Aug. 12, 1958 |

FOREIGN PATENTS

| 1,058,919 | Germany | June 4, 1959 |